United States Patent
Nagai et al.

(10) Patent No.: US 6,691,000 B2
(45) Date of Patent: Feb. 10, 2004

(54) ROBOT-ARM TELEMANIPULATING SYSTEM PRESENTING AUDITORY INFORMATION

(75) Inventors: Yasufumi Nagai, Choufu (JP); Shigeru Tsuchiya, Kokubunji (JP); Shinichi Kimura, Kashiwa (JP)

(73) Assignee: Communications Research Laboratory, Independent Administrative Institution, Tokyo (JP)

( * ) Notice: Subject to any disclaimer, the term of this patent is extended or adjusted under 35 U.S.C. 154(b) by 0 days.

(21) Appl. No.: 10/202,014

(22) Filed: Jul. 25, 2002

(65) Prior Publication Data

US 2003/0083784 A1 May 1, 2003

(30) Foreign Application Priority Data

Oct. 26, 2001 (JP) ........................................ 2001-328794

(51) Int. Cl.⁷ ............................................... G06F 19/00
(52) U.S. Cl. ..................... 700/245; 700/253; 700/257; 700/246; 700/264; 318/561; 318/568.11; 318/649; 340/407.1; 340/407.2; 340/680; 340/825.19; 434/112; 434/116
(58) Field of Search ............................... 700/245, 253, 700/246, 257, 264; 318/561, 568.11, 649; 340/407.1, 407.2, 680, 825.19; 434/112, 116

(56) References Cited

U.S. PATENT DOCUMENTS 6,553,355 B1 * 4/2003 Arnoux et al. ................. 706/13

OTHER PUBLICATIONS

Kimura et al., Teleoperation of Space Robots for Antenna Assembling Experiment on ETS–VII, 1998, Internet, pp. 1–6.*
Freitas et al., Advanced automation for space missions, 1982, Internet, pp. 1–10.*
Fong, Vehicle teleoperation interfaces, 2001, Internet, pp. 1–9–18.*
Vijayakumar et al., Fast and efficient incremental learning for high–dimensional movemetn systems, 2000, IEEE, pp. 1894–1899.*
Nagai et al. "Comparison of effects of audio feedback system in different tasks which performed in the robot arm experiment of the ETS–VII" SICE Jul. 2001.

* cited by examiner

Primary Examiner—William A. Cuchlinski, Jr.
Assistant Examiner—McDieunel Marc
(74) Attorney, Agent, or Firm—Browdy and Neimark

(57) ABSTRACT

A robot-arm telemanipulating system that presents an operator auditory information converted from a part of information on operating status of the robot arm (hereinafter referred to as "telemetry data") transmitted from a distant position from the operator, so that a burden imposed on the operator can be alleviated. The telemanipulating system includes a sound source for simulatively generating an operating sound of the robot arm under telemanipulation, capable of variably controlling at least one of key, volume and tone of the operating sound by sound source control data input from outside; a telemetry data analyzing unit for analyzing telemetry data transmitted from the robot arm, and controlling the sound source by generating sound source controlling data corresponding to a load amount applied to the robot arm; and an audio output unit for presenting the operator the operating sound generated by the sound source in a form of auditory information.

3 Claims, 4 Drawing Sheets

ROBOT-ARM TELEMANIPULATING SYSTEM PRESENTING AUDITORY INFORMATION

BACKGROUND OF THE INVENTION

1. Field of the Invention

The present invention relates to a robot-arm telemanipulating system to be used in a space station etc., more specifically to a telemanipulating system that presents simulatively generated operating sound of the robot arm to an operator of the robot arm in a form of auditory information.

2. Description of the Related Art

Recently the international space station has been built and space development has been more aggressively promoted, however in the aspect of operation of a large-scaled structure such as an antenna in the space, extravehicular activities of astronauts aboard a space station or a space shuttle are the only dependable measure.

Since the extravehicular activities are performed in such an extreme circumstance as the space, the vital risk for the workers as well as very high operation cost are always the major problems, therefore another substitutional measures in place of such human activities has been eagerly sought for.

Specifically, with an object to utilize space robots for the space jobs in the near future, various studies and experiments have been made by organizations of many countries on a robot arm for performing a space job through telemanipulation from the earth.

At present the operation of a robot arm in the space is executed depending on visual images transmitted from a monitoring camera attached close to the tip of the robot arm as well as from a plurality of monitoring camera placed in the proximity of the mounting base of the robot arm, therefore relevant techniques have been developed such as three-dimensional simulation for displaying three-dimensional images, or virtual reality technique for presenting predicted visual images to an operator considering a time-lag in the transmission of image data between the earth and the robot arm in the space.

The most essential issue to be taken into account regarding telemanipulation on the earth of a robot arm in the space is safety and reliability, since if a robot arm should unexpectedly collide with a peripheral equipment of a space station etc. during the operation, not only the robot arm but also the peripheral equipment of the space station may be damaged.

Once such an accident happens, it is practically impossible to repair the damages in the space with the technology available today, therefore operators who are operating the robot arm exclusively depending on visual information are under a great stress.

When operating status of the robot arm is visually presented, the operator is required to quickly recognize and judge a number of information and to manipulate the robot arm within a limited time, however actually it is an extremely difficult task to manipulate the robot arm watching a plurality of monitor screens at a time. Therefore it takes a long time to become an expert of robot-arm telemanipulation, and in case the operator is not yet sufficiently trained a heavy burden will be imposed on the operator.

Meanwhile, a force-sensitive feedback controller has also been recently studied, for feeding back load data such as force or torque applied to the robot arm as operational reaction force to the controller operated by an operator.

However, since a model has to be made up in a computer and a reaction force computed based on the model is provided back to the controller for establishing an interface of a force-sensitive feedback controller, this system has the disadvantage that modeling of operating environment becomes very difficult in case there is an error in the model or when the operating environment of the robot arm is complicated.

Accordingly, it is an object of the invention to solve the foregoing problems of the prior arts by providing a robot-arm telemanipulating system that presents an operator auditory information converted from a part of information on operating status of the robot arm (hereinafter referred to as "telemetry data") transmitted from a distant position from the operator, so that a burden imposed on the operator can be alleviated.

SUMMARY OF THE INVENTION

For accomplishing the foregoing object, the present invention provides a robot-arm telemanipulating system presenting auditory information, comprising a sound source for simulatively generating an operating sound of the robot arm under telemanipulation, capable of variably controlling at least one of key, volume and tone of the operating sound by sound source control data input from outside; means for analyzing telemetry data for analyzing telemetry data transmitted from the robot arm, and controlling the sound source by generating sound source controlling data corresponding to a load amount applied to the robot arm; and means for outputting auditory information for presenting an operator the operating sound generated by the sound source in a form of auditory information.

It is preferable that the robot-arm telemanipulating system presenting auditory information according to the invention employs a simulatively synthesized motor sound as operating sound of the robot arm, in such a manner that a key of the operating sound will be higher with an increase of the load amount applied to the robot arm.

It is still preferable that in the robot-arm telemanipulating system presenting auditory information according to the invention, variation rate of the key of the operating sound in compliance with the increase of the load amount becomes greater when the load amount applied to the robot arm has exceeded a predetermined value.

DESCRIPTION OF THE PREFERRED EMBODIMENTS

Figure 1:
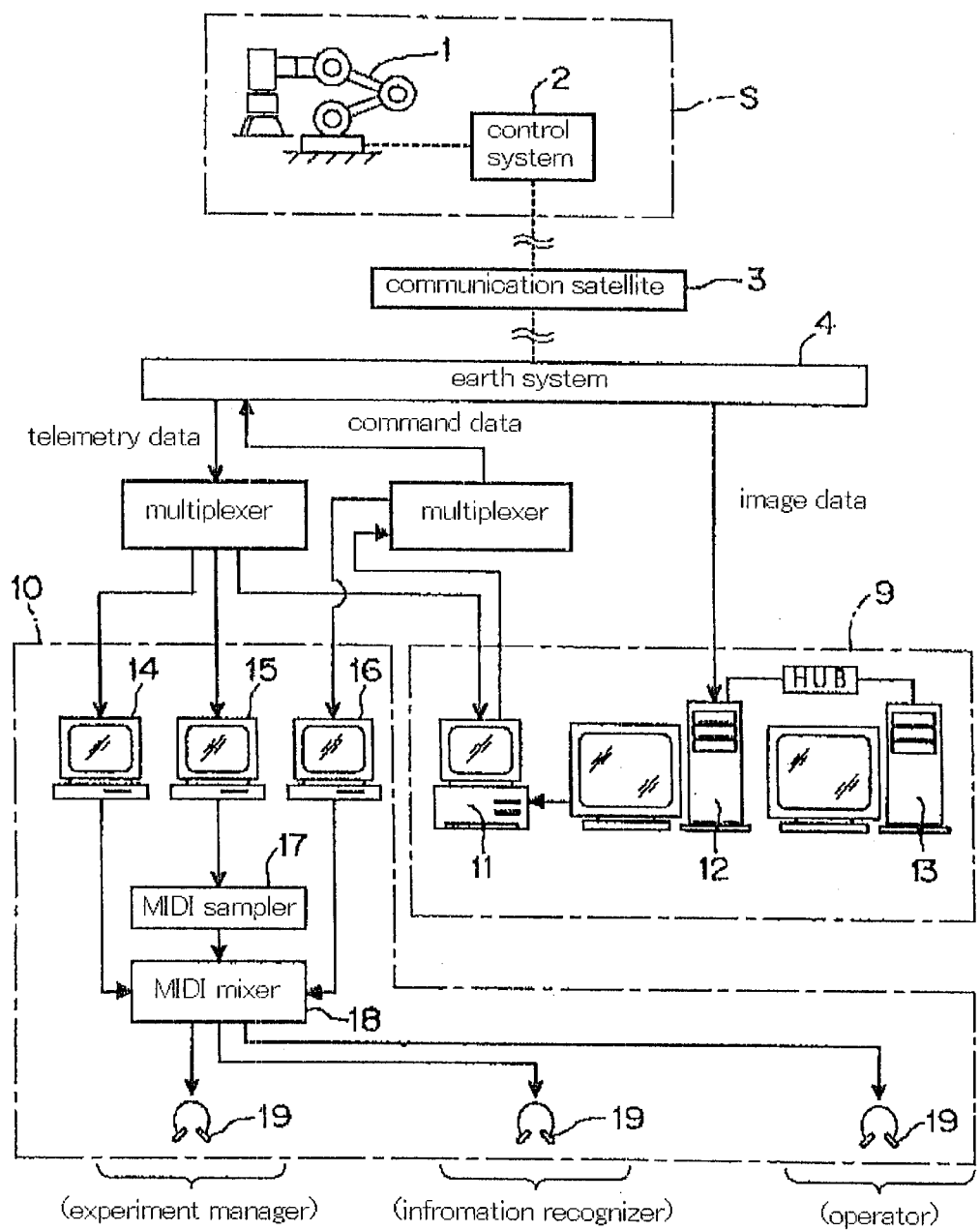
FIG. 1 is a block diagram showing a configuration of a telemanipulating system according to the embodiment of the present invention.

FIG. 1 is a block diagram showing a system configuration according to an embodiment of the present invention. The embodiment is represented by a simulative experiment of assembling an antenna on a test satellite S circulating on an orbit, and the test satellite S is provided with a robot arm 1 to be telemanipulated from the earth and a control system 2 for controlling the robot arm.

On the earth an earth system 4 is installed for data communication through a communication satellite 3 with the control system 2 provided in the test satellite S, and the control system 2 serves for communication of command data and telemetry data related to the robot arm 1 with the earth system 4 through the communication satellite 3.

Figure 2:
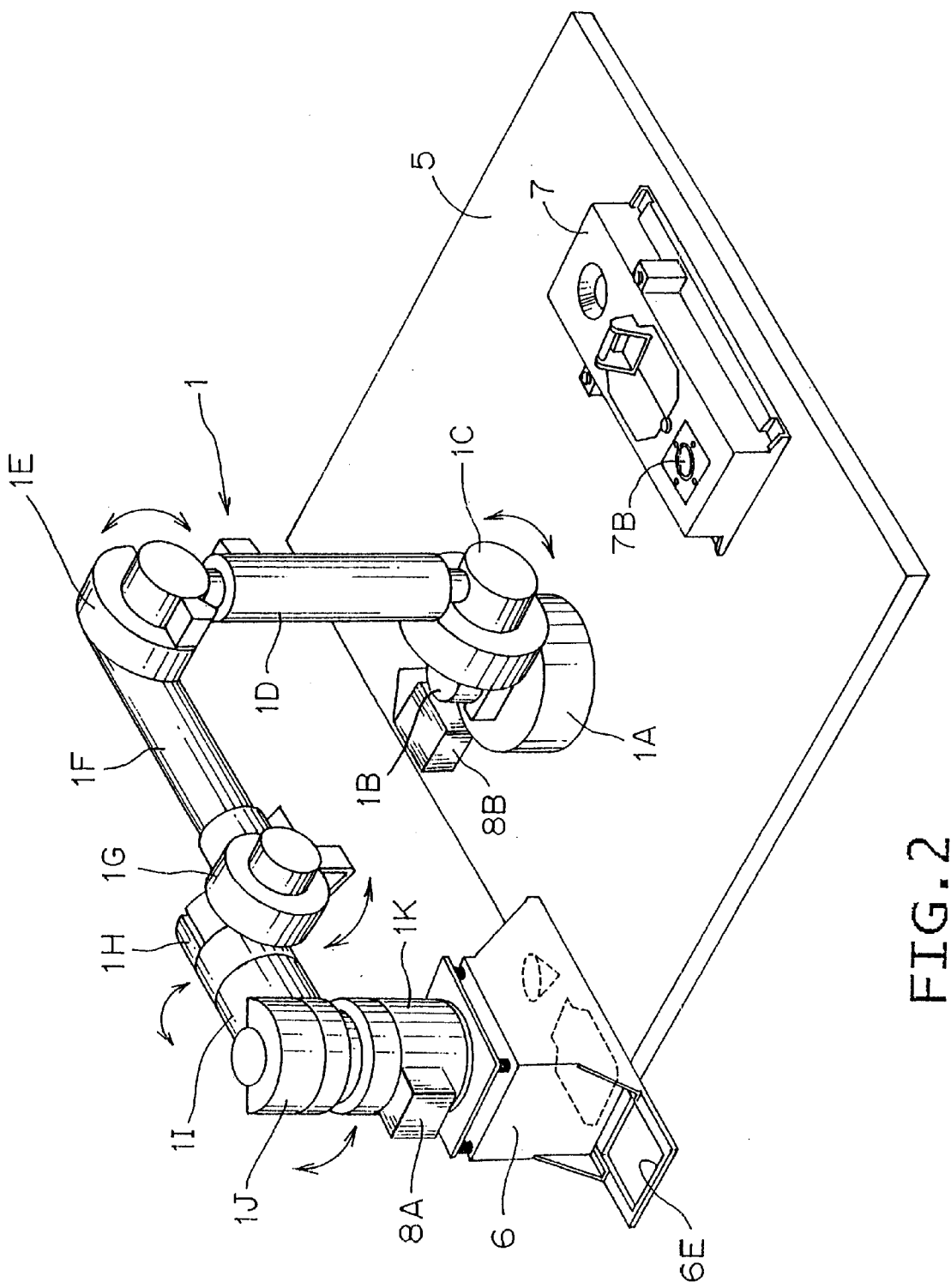
FIG. 2 is a perspective view showing an appearance of a robot arm employed in the embodiment of the invention.

In this embodiment a multi-joint type robot arm having an extensive motional freedom is employed on the test satellite as robot arm 1 to be telemanipulated from the earth through the control system 2, and as shown in FIG. 2 this robot arm is mounted on an arm base 1A fixed on a work table 5 and comprises the first link portion 1D connected with the first joint 1B through the second joint 1C, the second link portion 1F connected with the first link portion 1D through the third joint 1E, the fifth joint 1H connected with the second link portion 1F through the fourth joint 1G, the third link portion 1I connected with the fifth joint 1H, and a hand portion 1K connected with the third link portion through the sixth joint 1J.

In each of the joints 1C, 1E, 1G, 1H and 1J an individually controlled DC brushless motor, a rotary encoder for detecting rotation of the motor, etc. are incorporated, so that each joint can rotate.

Also, the hand portion 1K is of a cylindrical shape in this embodiment, and is driven to rotate by the fifth joint around an axial line that is perpendicular to the central axial line of the third link portion 1I.

On the work table 5, a combining module 6 and a fixed module 7 of an antenna assembly mechanism are prepared for a simulative experiment of antenna assembly job in the space, so that a job experiment of manipulating the robot arm 1 to combine the combining module 6 with the fixed module 7 can be performed.

Figure 3:
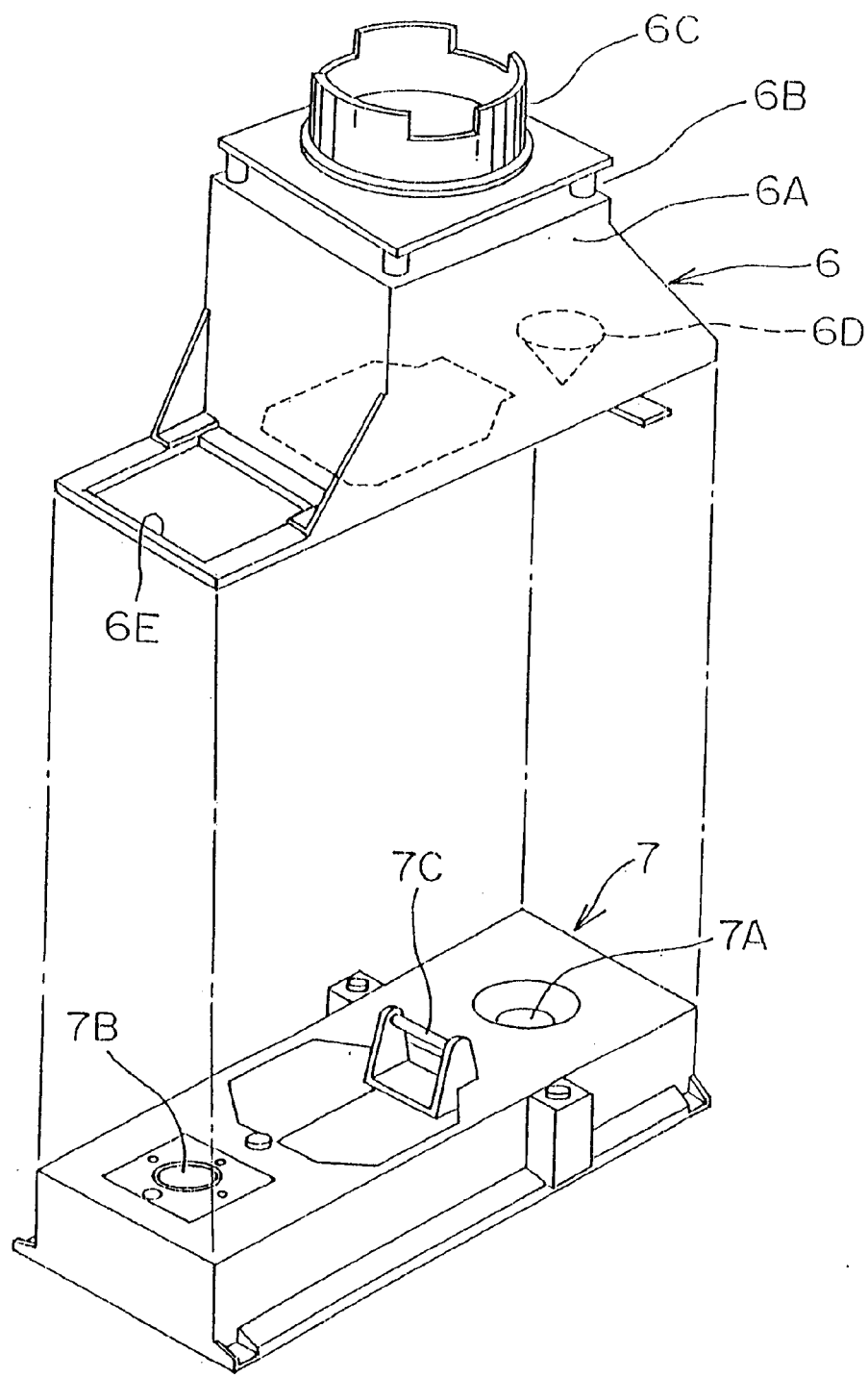
FIG. 3 is a perspective view showing an experimental antenna assembly mechanism employed in the embodiment of the invention.

Referring to FIG. 3, the combining module 6 is provided with a grapple fixture 6C connected with the module main body 6A through a compliance mechanism 6B, for being held thereat by the hand portion 1K of the robot arm 1. Also, the module main body 6A is provided with a guide cone 6D projecting downward from its bottom for positioning with the fixed module 7.

The compliance mechanism 6B is sustaining the grapple fixture 6C by springs in a floating state above the module main body 6A, to facilitate the assembly job by absorbing a possible deviation of the relative position of the modules during positioning and assembly of the combining module 6 with the fixed module 7 by the robot arm 1.

Meanwhile, the fixed module 7 is attached in advance to the work table 5, and a guide hole 7A having a conical inner circumferential surface that fits the guide cone 6D, as well as a target mark 7B and an engaging portion 7C to be engaged with a latch mechanism (not shown) mounted within the module main body 6A are provided on the upper surface of the fixed module 7.

The latch mechanism will unite the combining module 6 with the fixed module 7 into one body by engaging with the engaging portion 7C. Also, the engaging and releasing action of the latch mechanism can be telemanipulated from the earth through the control system 2 installed on the test satellite S.

The target mark 7B is provided for adjustment of the position of the combining module 6 when the robot arm 1 carries the combining module 6 to an area above the fixed module 7, in such a manner that the target mark 7B comes inside of a frame 6E attached to a bottom portion of the module main body 6A when viewed through a monitor camera 8A attached to the sidewall of the hand portion 1K.

In addition, a monitor camera 8B is installed on the first joint 1B for monitoring status of each part of the robot arm 1.

In the earth system 4, a telemanipulating system 9 and an auditory information presenting system 10 are included. The telemanipulating system 9 comprises three computers i.e. an information presenting terminal 11, operating terminal 12 and image display terminal 13, and an information recognizer is responsible for the information presenting terminal 11, and an operator is responsible for the operating terminal 12 and the image display terminal 13.

The information presenting terminal 11 is an interface computer acting between the earth system 4 and the operating and image display terminals 12, 13 through an RS232C line, and its screen provides a value display of commands and various telemetry data such as position or posture of the tip (the hand portion 1K) of the robot arm 1.

The information presenting terminal 11 records a log of such commands and telemetry data. Also, the information presenting terminal 11 can only transmit from itself an emergency stop command for the robot arm 1.

The operator can control the robot arm 1 in two control modes, i.e. program mode and manual mode. Under the program mode control, control programs are stored in the operating terminal 12, and when the operator clicks a button in a window displayed in the screen a command is transmitted to the control system 2 on the satellite through the information presenting terminal 1, earth system 4 and the communication satellite 3 respectively.

In contrast, under the manual mode the operator inputs a numerical value in millimeter of desired relative travel of the hand portion 1K of the robot arm 1, so that a command will likewise be transmitted to the control system 2 on the satellite.

The auditory information presenting system 10 comprises telemetry data analyzing terminals 14 and 15, three computers for command check terminal 16, two MIDI (Musical Instrument Digital Interface) apparatus i.e. MIDI sampler 17 and MIDI mixer. Telemetry data analyzing terminals 14, 15 and command check terminal 16 are operated by an experiment manager.

Now, transmission process of information during a job of combining the combining module 6 with the fixed module 7 on the worktable 5 by the robot arm 1 as shown in FIG. 2 shall be described hereunder.

The image display terminal 13 displays image data transmitted from the monitor cameras 8A, 8B respectively attached to the hand portion 1K and the first joint 1B of the robot arm 1, while the operator checks such image and operates the operating terminal 12 to emit a command for the robot arm 1 so that the command will be emitted from the operating terminal 12 through the information presenting terminal 11 to the earth system 4, to be further transmitted to the control system 4 on the test satellite S through the communication satellite 3, thus to cause the robot arm 1 to act in compliance with the command.

On the other hand, the command output from the information presenting terminal 11 is input to the command check terminal 16. Upon detecting the command, the command check terminal 16 provides sound information recorded in advance corresponding to the command to the MIDI mixer 18, from which human voice is output to headphones 19 that the experiment manager, information recognizer and the operator respectively wear as means for outputting auditory information.

Further, this human voice, which is utilized for proving whether the command emitted from the operating terminal 12 is correct, is announced for example from the left channel of the headphones 19 in a female voice. Examples of practically announced voices include "rectilinear action command emitted", "position retention command emitted", etc.

Meanwhile, the telemetry data regarding the robot arm 1 is transmitted from the control system 2 on the test satellite S to the earth system 4 through the communication satellite 3.

The telemetry data received by the earth system 4 is analyzed by the two telemetry data analyzing terminals 14, 15, out of which the telemetry data analyzing terminal 14 detects changes of action status of the robot arm 1 or peripheral equipment status and converts into sound information recorded in advance in the computer 14.

Such sound information, which is utilized for confirming execution of the command instructed by the operator from the operating terminal 12 through the information presenting terminal 11, is input from the telemetry analyzing terminal 14 to the MIDI mixer 18, to be output in human voice to the headphones 19 respectively worn by the experiment manager, information recognizer and the operator. In addition, such human voice is announced from the right channel of the headphones 19 in a male voice according to this embodiment.

Meanwhile, according to this embodiment a motor sound sampled in advance is recorded in the MIDI sampler 17 that is employed as a sound source, so that the telemetry analyzing terminal 15, acting as means for analyzing telemetry data, will analyze the telemetry data related to force or torque applied to the hand portion 1K of the robot arm 1, and output a signal (MIDI message) designating a key of the motor sound corresponding to the telemetry data to the MIDI sampler 17.

At this stage the telemetry data analyzing terminal 15 computes the respective norm of force and torque applied to the hand portion 1K of the robot arm 1 and normalizes the respective values at the maximum permissible values, to transmit a MIDI message corresponding to the greater normalized value to the MIDI sampler 17.

The MIDI sampler 17 will then generate a simulative motor sound by converting the sampled motor sound into a sound of a key corresponding to the aforementioned value, and such motor sound will be output to both left and right channels of the headphones 19 respectively worn by the experiment manager, information recognizer and the operator through the MIDI mixer 18.

Figure 4:
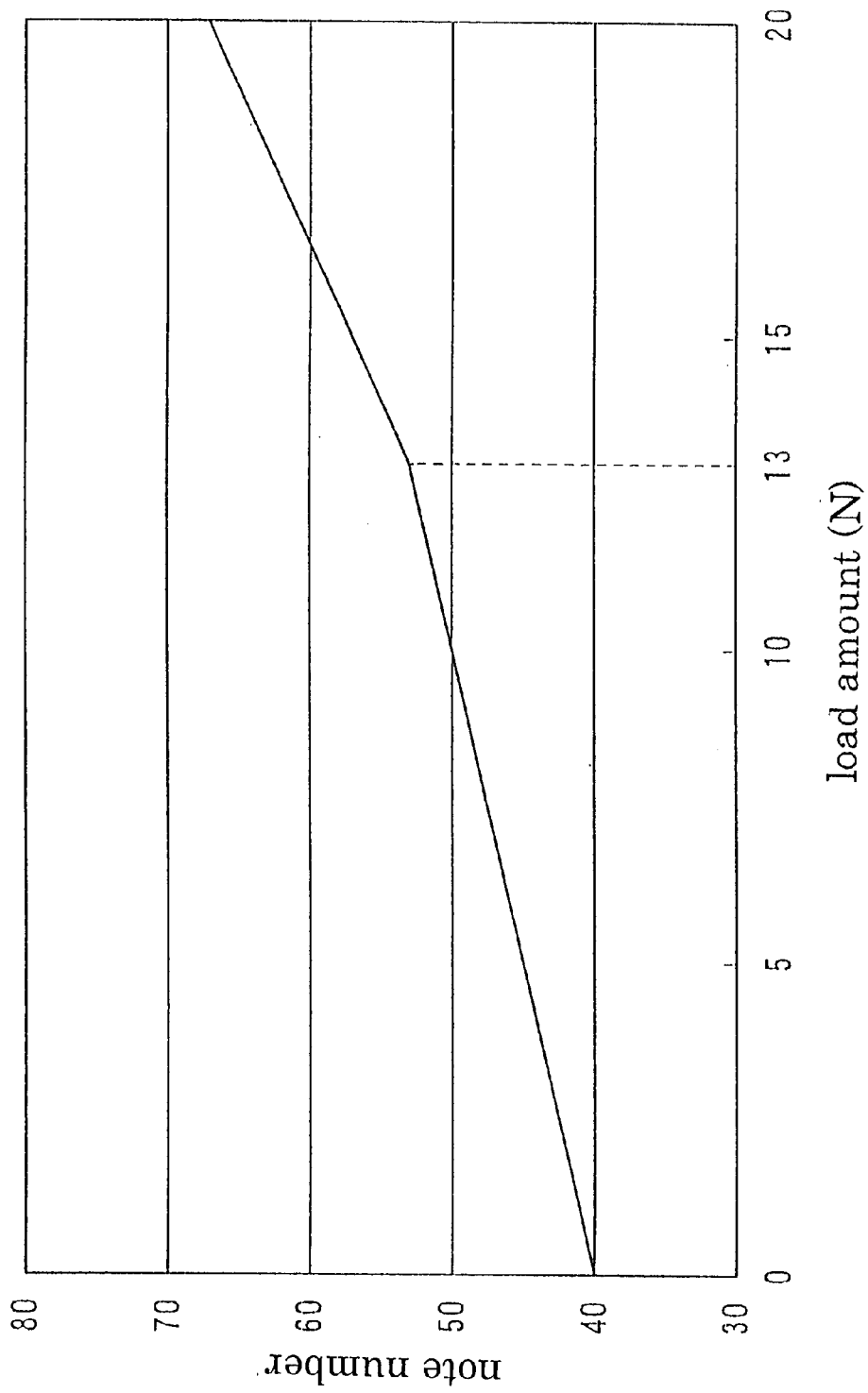
FIG. 4 is a line graph showing a relation between load amount applied to the robot arm tip and key of a motor sound generated in compliance with the load amount.

Now, FIG. 4 shows an example of relation between load amount (N) applied to the hand portion 1K of the robot arm 1 and a key (note number) of simulatively generated motor sound and as shown therein, according to this embodiment, the key of the simulated motor sound goes up along a gentle straight slope with the increase of the load in a load range not greater than 13N, while the straight slope of the key of the motor sound becomes steeper in a load range exceeding 13N.

In this example the maximum limited load is 20N, and it is preferable to raise the key of the simulated motor sound at an even greater increment when the load amount is increased up to the proximity of this value, so as to alert the operator not to impose excessive load on the hand portion 1K.

Also, in a load range not greater than 13N, the simulated motor sound only serves as means for informing operating status of the robot arm 1 to the operator, and for such purpose the simulated motor sound of the note number 40 is output from the headphones 19 of the operator when the robot arm 1 is activated even though any load is not applied to the hand portion 1K, so that the operator will recognize that the robot arm 1 has been activated.

Also, according to this embodiment the key of the motor sound is increased with the increase of the load amount, while without limitation to such method it is also preferable to increase the volume of the motor sound, or to change the tone of the motor sound. Further, it is also preferable to change two or more among the key, volume and tone simultaneously, to create a more realistic sensation.

Also, without limitation to the motor sound, it is also preferable to simulate a sound that may be generated from moving parts of the robot arm 1, for example to output a simulative squeaking noise of gears or bearings when the load amount comes close to the maximum permissible value.

Further, according to this embodiment a sampler of MIDI specification in which a motor sound is recorded by sampling in advance is employed as sound source, while the sound source is not limited thereto, and as long as an apparatus can synthesize a simulative sound by itself and change the key, volume or tone by an external signal, for example a synthesizer module of MIDI specification, such apparatus can be employed as sound source.

Further, the robot-arm telemanipulating system presenting auditory information according to the invention is applicable not only to a robot arm equipped on a space station etc., but also to a robot arm employed in an extensive fields including, but not limited to, working circumstances with a vital risk such as deep sea or nuclear plants, or working circumstances where minute organic tissue or mechanical components are handled under a microscope.

As described above, according to the invention set forth in the appended claim 1, since auditory information can reach an operator while he/she is not paying particular attention, frequency of visually checking monitor screens can be reduced and as a result burden of the operator can be alleviated.

Also, since the operator can sensitively recognize a change trend of load applied to the robot arm, an unskilled operator can still perform accurate operation in a highly responsive manner.

Further, according to the invention set forth in the appended claim 2, since a virtual motor sound that will raise its key with an increase of load amount applied to the robot arm is presented to the operator in a form of auditory information, a natural and realistic sensation is created so that the operator can easily acquire information required for the operation of the robot arm.

Furthermore, according to the invention set forth in the appended claim 3, since variation rate of the key of the motor sound becomes greater when the load amount applied to the robot arm has exceeded a predetermined value, the operator can be alerted so as not to apply an excessive load to the robot arm.

What is claimed is:

1. A robot-arm telemanipulating system presenting auditory information comprising:
   a sound source for simulatively generating an operating sound of said robot arm under telemanipulation, for variably controlling at least one of key, volume and tone of said operating sound by sound source control data input from outside;
   means for analyzing telemetry data transmitted from said robot arm, and controlling said sound source by generating sound source controlling data corresponding to a load amount applied to said robot arm; and
   means for outputting auditory information for presenting an operator said operating sound generated by said sound source in a form of auditory information.

2. The robot-arm telemanipulating system presenting auditory information as set forth in claim 1, wherein a simulatively synthesized motor sound is employed as said operating sound of said robot arm, in such a manner that a key of said operating sound will be higher with an increase of said load amount applied to said robot arm.

3. The robot-arm telemanipulating system presenting auditory information as set forth in claim 2, wherein variation rate of said key of said operating sound in compliance with said increase of said load amount becomes greater when said load amount applied to said robot arm has exceeded a predetermined value.

* * * * *